United States Patent
Suzuki

(10) Patent No.: US 6,222,330 B1
(45) Date of Patent: Apr. 24, 2001

(54) HORIZONTAL DEFLECTING CIRCUIT

(75) Inventor: Hitoshi Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/324,440

(22) Filed: Jun. 2, 1999

(30) Foreign Application Priority Data

Jun. 5, 1998 (JP) ................................................. 10-157247

(51) Int. Cl.⁷ .................................................... G09G 1/04
(52) U.S. Cl. ............................................ 315/408; 315/371
(58) Field of Search ............................... 315/408, 411, 315/399, 370, 371, 403

(56) References Cited

U.S. PATENT DOCUMENTS

| | | | |
|---|---|---|---|
| 4,719,394 | * | 1/1988 | Watanuki ............................... 315/408 |
| 5,019,754 | * | 5/1991 | Onozawa et al. ...................... 315/408 |
| 5,032,770 | * | 7/1991 | Hayase .................................. 315/408 |
| 5,485,062 | * | 1/1996 | Sahara et al. .......................... 315/408 |
| 5,955,848 | * | 9/1999 | Arima et al. .......................... 315/371 |
| 5,962,993 | * | 10/1999 | Kashiwagi ............................. 315/371 |

* cited by examiner

Primary Examiner—David Vu
Assistant Examiner—Hoang Nguyen
(74) Attorney, Agent, or Firm—Jay H. Maioli

(57) ABSTRACT

A power source to drive a deflecting output unit is fixed, thereby simplifying so that it is possible to cope with two or more different horizontal frequencies. A resonance capacitor 4a and an auxiliary resonance capacitor 4b are serially connected and a variable capacitive switching element 7 to short-circuit the capacitor 4b is connected. When a tracing period changes from $Tt$ to $Tt'$ ($Tt<Tt'$) in correspondence to a change from a first horizontal frequency on the high side to a second horizontal frequency on the low side, by turning on the variable capacitive switching element 7, the capacitor 4b is short-circuited and a capacitance is increased from $C1 \cdot C1'/(C1+C1')$ to $C1$, thereby enabling ($Tr'=Tr \cdot Tt'/Tt$) to be satisfied. Even when a fixed power source is used, a voltage of a retrace pulse does not change and a fluctuation of another voltage such as an anode voltage or the like which is formed from the retrace pulse can be prevented.

3 Claims, 4 Drawing Sheets

HORIZONTAL DEFLECTING CIRCUIT

BACKGROUND OF THE INVENTION

1. Field of the Invention

The invention relates to a horizontal deflecting circuit suitable for use in a multiscan type television receiver which can receive video signals of different horizontal frequencies.

2. Description of the Related Art

Generally, in a television receiver corresponding to a plurality of different horizontal frequencies, in order to assure a necessary raster width, a power voltage which is different for every frequency is supplied to a horizontal deflecting circuit. FIG. 6 shows an example of such a horizontal deflecting circuit. In FIG. 6, reference numeral 21 denotes a variable voltage power source. A (−) terminal of the variable voltage power source 21 is connected to the ground. A (+) terminal of the power source 21 is connected to the ground via a coil 22, a horizontal deflecting coil 25, and an S-shaped correcting curve provided by capacitor 26. A switching element 23 for horizontal output is connected between the ground and a node of the coil 22 and horizontal deflecting coil 25. This node is connected to the ground via a resonance capacitor 24.

The variable voltage power source 21 supplies an electric power necessary for maintaining the resonance to the horizontal deflecting circuit through the coil 22. For a tracing period of time during which the horizontal outputting switching element 23 is turned on, a voltage of the capacitor 26 is applied across the horizontal deflecting coil 25. When a capacitance of the capacitor 26 is enough large, a saw-tooth wave current having a predetermined inclination flows in the horizontal deflecting coil 25 and a saw-tooth wave current having a predetermined inclination also similarly flows in the coil 22.

Subsequently, when the horizontal outputting switching element 23 is turned off for a retracing period of time, the current flowing in the horizontal deflecting coil 25 and coil 22 flows into the resonance capacitor 24, so that a voltage (called a retrace pulse) is generated across the resonance capacitor 24. A voltage of the retrace pulse generated across the resonance capacitor 24 reaches a peak value at time Tr/2 shown by the following equation (1).

$$Tr/2 = (\pi/2) \times \sqrt{(L \cdot C)} \quad (1)$$

$$L = L1 \cdot L2/(L1+L2)$$

where,

L1: inductance of the coil 22

L2: inductance of the horizontal deflecting coil 25

C: capacitance of the resonance capacitor 24

In equation (1), $\sqrt{( )}$ denotes the square root of the value in the parentheses.

A peak value Vcp of the retrace pulse is obtained by the following equation (2).

$$Vcp = V \cdot (1 + (\pi/2) \cdot (Tt/Tr)) \quad (2)$$

where,

V: voltage of the variable voltage power source 21

Tt: tracing period

After that, the resonance capacitor 24 discharges the accumulated charges. When the voltage across the capacitor 24 is equal to 0, the horizontal outputting switching element 23 is again turned on and the foregoing operation is repeated. Thus, the saw-tooth wave current flows in the horizontal deflecting coil 25. In an actual circuit, by a combination of a bipolar transistor and a diode is often used as a horizontal outputting switching element 23 and, when the voltage across the resonance capacitor 24 exceeds a forward voltage of the diode, the circuit is automatically short-circuited.

The applicant of the present invention has proposed a multiscan type television receiver disclosed in JP-A-61-96875 (Japanese Patent Application No. 218863/1984). According to a horizontal deflecting circuit in the television receiver, a variable voltage power source is used. The variable voltage power source is controlled so that the product of a power voltage from the variable voltage power source and a horizontal tracing time is made constant. A serial circuit of a plurality of capacitors and a connection switch is connected in parallel with a resonance capacitor. By controlling so as to increase an electrostatic capacitance of a horizontal retrace capacitor as a frequency of a horizontal sync signal decreases and to make a high output voltage constant, it is possible to cope with a change in horizontal frequency of about twice.

However, in case of the horizontal deflecting circuit using the variable voltage power source, it is necessary that a dedicated variable voltage power source unit for the horizontal deflecting circuit is added separately from a main power supplying unit to output a predetermined voltage or the main power supplying unit itself is used as a variable voltage power source. There are consequently problems such that a construction of the power supplying unit becomes complicated, a circuit scale of the whole apparatus increases, and the costs rise.

In case of setting a duration of the retracing period constant, as shown in the equation (2), since the voltage of the retrace pulse generated for the retracing period rises as the horizontal frequency decreases, there is a possibility that unless the change in power voltage can transiently trace the frequency change, a voltage higher than the ordinary one is applied to elements constructing the circuit. There are, thus, problems such that a circuit construction to prevent the reliability from being lost is necessary and, further, the circuit becomes complicated.

Moreover, in a horizontal deflecting circuit of the conventional type such that the coil 22 provided between the horizontal deflecting coil 25 and variable voltage power source 21 is set to a transformer structure like a flyback transformer and a secondary output such as a high voltage or heater voltage which is applied to an anode of a cathode ray tube (CRT) is extracted from the secondary coil 22, by changing a power voltage that is supplied to the horizontal deflecting circuit, a peak value of the retrace pulse and a voltage for the tracing period change. Since the secondary output is formed by rectifying the retrace pulse and the voltage for the tracing period, the secondary output also fluctuates and there is a problem that a necessary constant voltage cannot be extracted.

In FIG. 7, a solid line waveform and a broken line waveform indicate retrace pulses when horizontal frequencies are different. Although a voltage according to a turn ratio with a primary coil is generated in the secondary coil of the transformer, as shown in FIG. 7, a voltage from a mean value of 0, namely, AC=0 is rectified for the tracing or retracing period and is extracted. There is, consequently, a problem that the secondary output fluctuates.

OBJECTS AND SUMMARY OF THE INVENTION

It is, therefore, an object of the invention to provide a horizontal deflecting circuit which can simplify a whole circuit without needing to change a power voltage.

Another object of the invention is to provide a horizontal deflecting circuit which can stably extract a secondary output.

Still another object of the invention is to provide a horizontal deflecting circuit which can be easily constructed in common with a circuit in which a horizontal frequency is limited to one kind.

To accomplish the above objects, according to the invention of claim 1, there is provided a horizontal deflecting circuit for displaying an image based on an input video signal of a first horizontal frequency and an image based on an input video signal of a second horizontal frequency different from the first horizontal frequency to a CRT, comprising: a serial connecting circuit of a horizontal deflecting coil and a correcting capacitor; switching means connected in parallel across the serial connecting circuit; a variable capacitive resonance capacitor connected in parallel across the serial connecting circuit; a primary coil whose one end is connected to the serial connecting circuit and whose the other end is connected to a fixed power source; and a secondary coil, connected to the primary coil, for forming another voltage from a retrace pulse that is generated in the primary coil, wherein a value of the variable capacitive resonance capacitor is changed so that a voltage of the retrace pulse in a case where the circuit is driven at the first horizontal frequency and that in a case where the circuit is driven at the second horizontal frequency are set to a substantially same value.

According to the invention, a capacitance C1 of a resonance capacitor and a capacitance C1' of an auxiliary resonance capacitor are selected as a combination which satisfies a predetermined relation and, for example, a switch is provided in parallel with the auxiliary resonance capacitor. When a tracing period changes from Tt to Tt' (Tt<Tt') in correspondence to a change from the first horizontal frequency on the high side to the second horizontal frequency on the low side, by turning on the switch, the other resonance capacitor is short-circuited and the capacitance is increased from C1•C1'/(C1+C1') to C1 so as to satisfy (Tr'=Tr•Tt'/Tt; Tr denotes a retracing period of the first horizontal frequency). Even if a fixed voltage power source is used, the voltage of the retrace pulse does not change and a fluctuation of the other voltage such as an anode voltage or the like which is formed from the retrace pulse can be prevented.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
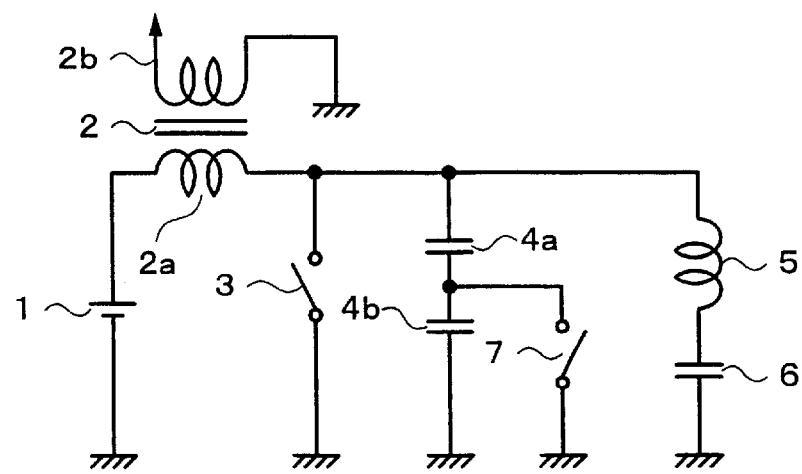
FIG. 1 is a connection diagram of an embodiment of the invention.

An embodiment of the invention will now be described hereinbelow with reference to the drawings. In FIG. 1 showing a whole construction, reference numeral 1 denotes a power source of a fixed output voltage.

A (−) terminal of the power source 1 is connected to the ground and a (+) terminal is connected to the ground through a primary coil 2a of a flyback transformer 2, a horizontal deflecting coil 5, and an S-shaped correcting curved is provided by a capacitor 6. A switching element 3 for horizontal output is connected between the ground and a node of the primary coil 2a and the horizontal deflecting coil 5. This node is connected to the ground through a resonance capacitor 4a and an auxiliary resonance capacitor 4b which are serially connected. A variable capacitive switching element 7 is connected between the ground and a node of the capacitors 4a and 4b. When the variable capacitive switching element 7 is turned on, both ends of the capacitor 4b are short-circuited. It is now assumed that the resonance capacitor 4a and auxiliary resonance capacitor 4b have capacitance values which satisfy a predetermined relation as will be explained hereinlater. A pulse voltage according to a turn ratio between the primary coil 2a and a secondary coil 2b is generated in the secondary coil 2b of the flyback transformer 2. By supplying the pulse voltage to a high voltage rectifying circuit (not shown), a high voltage is formed and supplied to an anode of a CRT (not shown).

The power source 1 supplies an electric power necessary to maintain the resonance to the horizontal deflecting circuit. First, when an input video signal of a first horizontal frequency on the high frequency side is displayed on the CRT, the variable capacitive switching element 7 is turned off. For a tracing period of time during which the horizontal outputting switching element 3 is turned on, the voltage of the capacitor 6 is applied across the horizontal deflecting coil 5. When the capacitance of the capacitor 6 is sufficiently larger than those of the resonance capacitor 4a and auxiliary resonance capacitor 4b, a saw-tooth wave current having a predetermined inclination flows in the horizontal deflecting coil 5. Similarly, a saw-tooth wave current having a predetermined inclination also flows in the primary coil 2a.

When the horizontal outputting switching element 3 is subsequently turned off for a retracing period, the current flowing in the horizontal deflecting coil 5 and primary coil 2a flows into the capacitors 4a and 4b and a voltage is generated across the capacitors 4a and 4b. The voltage of a retrace pulse generated across the capacitors 4a and 4b reaches a peak value at time Tr/2 shown by the following equation (3).

$$Tr/2 = (\pi/2) \times \sqrt{(L \cdot C)} \qquad (3)$$

$$L = L1 \cdot L2/(L1+L2)$$

$$C = C1 \cdot C1'/(C1+C1')$$

where,

L1: inductance of the primary coil 2a

L2: inductance of the horizontal deflecting coil 5

C1: capacitance of the resonance capacitor 4a

C1': capacitance of the auxiliary resonance capacitor 4b

In the equation (3), $\sqrt{\phantom{x}}$( ) denotes the square root of the value in the parentheses.

A peak value Vcp at that time is obtained by the following equation (4).

$$Vcp = V \cdot (1 + (\pi/2) \cdot (Tt/Tr)) \qquad (4)$$

where,

V: output voltage of the fixed voltage power source 1

Tt: tracing period

Figure 2:
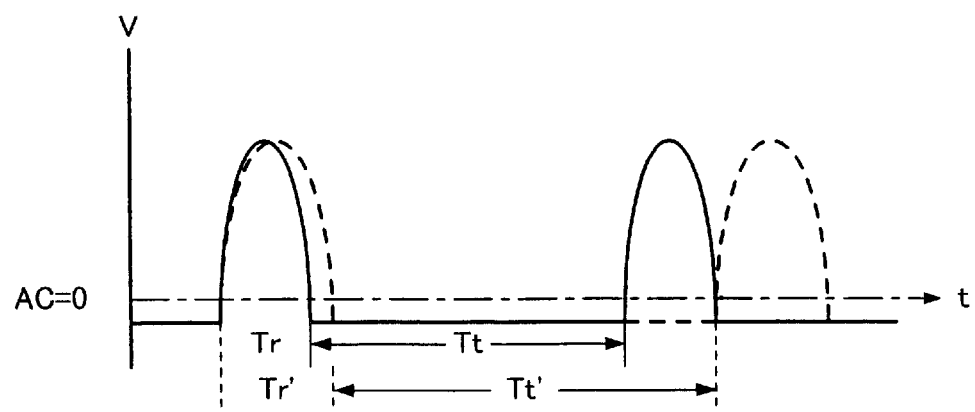
FIG. 2 is a waveform diagram for use in explanation of the operation of the embodiment of the invention.

After that, the capacitors 4a and 4b discharge the accumulated charges. When the voltage across the capacitors 4a and 4b is equal to 0, the horizontal outputting switching element 3 is again turned on and the foregoing operation is repeated. Thus, the saw-tooth wave current flows in the horizontal deflecting coil 5 and a retrace pulse shown by a solid line in FIG. 2 is generated across the primary coil 2a.

At the second horizontal frequency on the low frequency side, the horizontal outputting switching element 3 is turned on/off for the tracing period and the retracing period in the ON state of the variable capacitive switching element 7 in a manner similar to the foregoing case. In this instance, now assuming that the tracing period changes from Tt to Tt' by a change in horizontal frequency, a peak value Vcp' of the retrace pulse has a value shown by the following equation (5) from the equation (4).

$$Vcp' = V \cdot (1 + (\pi/2) \cdot (Tt'/Tr)) \qquad (5)$$

By varying the retracing period Tr in correspondence to a change in tracing period so that Vcp=Vcp', the peak value of the retrace pulse can be made constant irrespective of a difference of the horizontal frequencies. That is, from $$V \cdot (1 + (\pi/2) \cdot (Tt/Tr)) = V \cdot (1 + (\pi/2) \cdot (Tt'/Tr))$$

it is sufficient to satisfy the following relation.

$$Tr' = Tr \cdot Tt'/Tt \qquad (6)$$

Therefore, when the tracing period corresponding to the second horizontal frequency on the low side Is equal to Tt' (Tt<Tt'), the variable capacitive switching element 7 is turned on and the auxiliary resonance capacitor 4b is short-circuited. A synthetic capacitance when the variable capacitive switching element 7 is OFF is equal to C1·C1'/(C1+C1'). A capacitance when the variable capacitive switching element 7 is ON is equal to C1. The capacitance value in case of only C1 is larger. Thus, the equation (6) is satisfied.

The retrace pulse at this time is shown in FIG. 2. In FIG. 2, a waveform shown by a solid line (the first horizontal frequency) indicates a retrace pulse which is generated for the tracing period Tt and retracing period Tr. A waveform shown by a broken line (the second horizontal frequency) indicates a retrace pulse which is generated for the tracing period Tt' and retracing period Tr'. As shown in FIG. 2, it will be understood that the voltages which are generated for the tracing period and retracing period are constant even if the horizontal frequency changes. Therefore, the high voltage that is formed by the rectifying circuit connected to the secondary coil 2b of the flyback transformer 2 can be also made constant.

Figure 3:
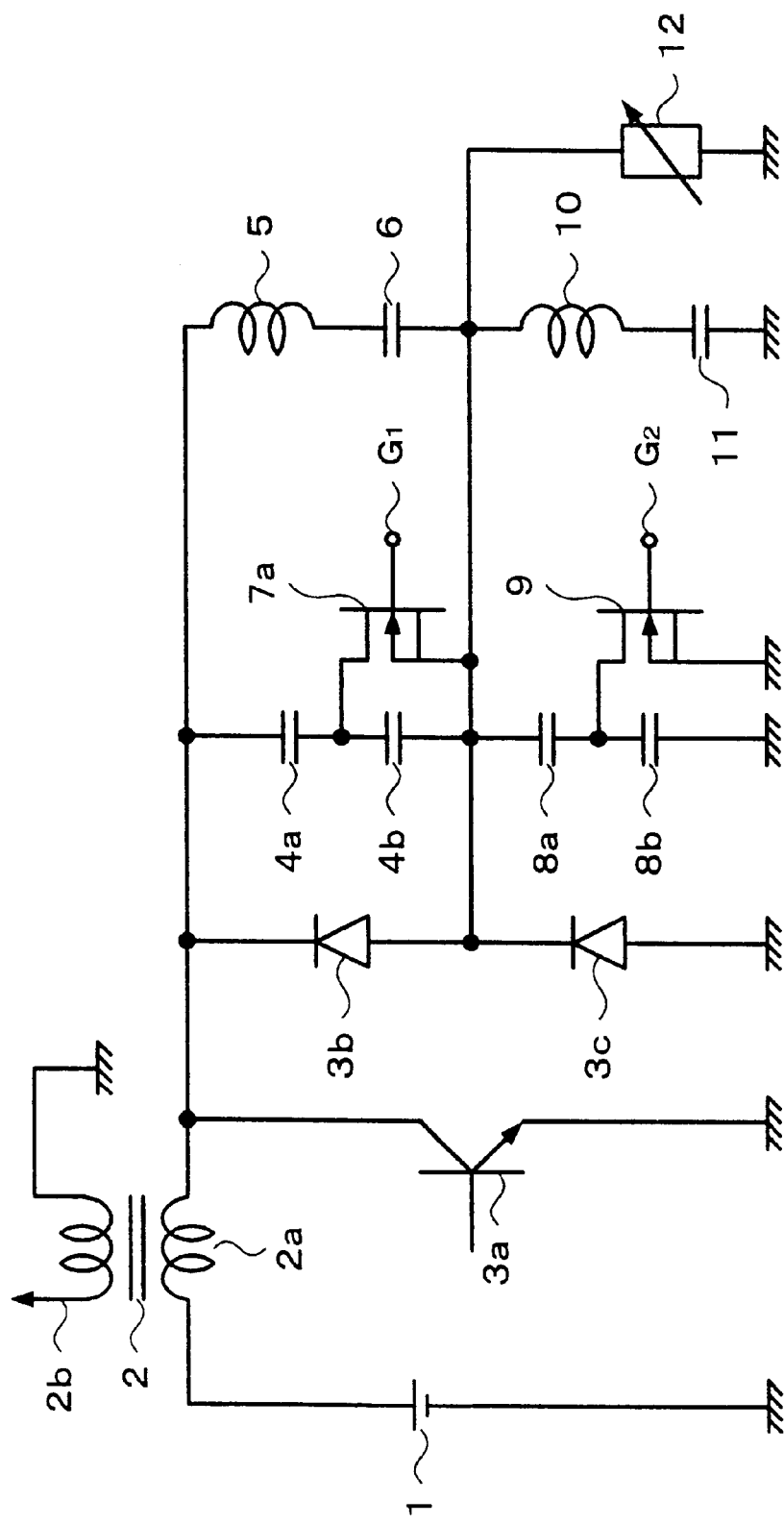
FIG. 3 is a connection diagram of another embodiment of the invention.

FIG. 3 shows another embodiment in which the invention is applied to a horizontal deflecting circuit of what is called a diode modulator construction. In another embodiment, an npn-type transistor 3a and damper diodes 3b and 3c are provided in place of the horizontal outputting switching element 3 in the foregoing embodiment. A coil 10 for modulation, a second S-shaped correcting capacitor 11, a second resonance capacitor 8a, a second auxiliary resonance capacitor 8b, MOS-type FETs 7a and 9 of an n channel as switching elements, and a variable load 12 are provided.

According to the circuit construction of FIG. 3, even if the voltage across the horizontal deflecting coil 5 is varied to adjust a raster width, so long as the power voltage is constant, the voltage across the primary coil 2a is also constant. The first resonance capacitor 4a and first auxiliary resonance capacitor 4b are selected as a combination which satisfies the equation (6) in a manner similar to the foregoing embodiment. With respect to the second resonance capacitor 8a and second auxiliary resonance capacitor 8b as well, they are selected as a combination which satisfies the equation (6) in a manner similar to the foregoing embodiment.

The fixed voltage power source 1 is connected to the ground via the primary coil 2a of the flyback transformer 2, horizontal deflecting coil 5, first S-shaped correcting capacitor 6, modulating coil 10, and second S-shaped correcting capacitor 11. A collector of the transistor 3a is connected to a node of the primary coil 2a and horizontal deflecting coil 5. An emitter of the transistor 3a is connected to the ground. The serially connected two damper diodes 3b and 3c are connected between the ground and the node of the primary coil 2a and horizontal deflecting coil 5. Further, a serial circuit of the first resonance capacitor 4a, first auxiliary resonance capacitor 4b, second resonance capacitor 8a, and second auxiliary resonance capacitor 8b is connected between the ground and the node of the primary coil 2a and horizontal deflecting coil 5. A node of the damper diodes 3b and 3c, a node of the capacitors 4b and 8a, and a node of the S-shaped correcting capacitor 6 and modulating coil 10 are connected in common and the variable load 12 is connected to the common node.

A drain and a source of the FET 7a are connected across the first auxiliary resonance capacitor 4b. A drain and a source of the FET 9 are connected across the second auxiliary resonance capacitor 8b. A terminal G1 is led out from a gate of the FET 7a. When the terminal G1 is set to the high level, the FET 7a is turned on. By the turn-on of the FET 7a, both ends of the capacitor 4b are short-circuited and only the resonance capacitor 4a functions. A terminal G2 is led out from a gate of the FET 9. When the terminal G2 is set to the high level, the capacitor 8b is short-circuited and only the resonance capacitor 8a functions.

In the foregoing other embodiment, by turning on the FETs 7a and 9 when the horizontal frequency decreases and by short-circuiting the capacitors 4b and 8b, the resonance frequency can be reduced in a manner similar to the foregoing embodiment.

Figure 4:
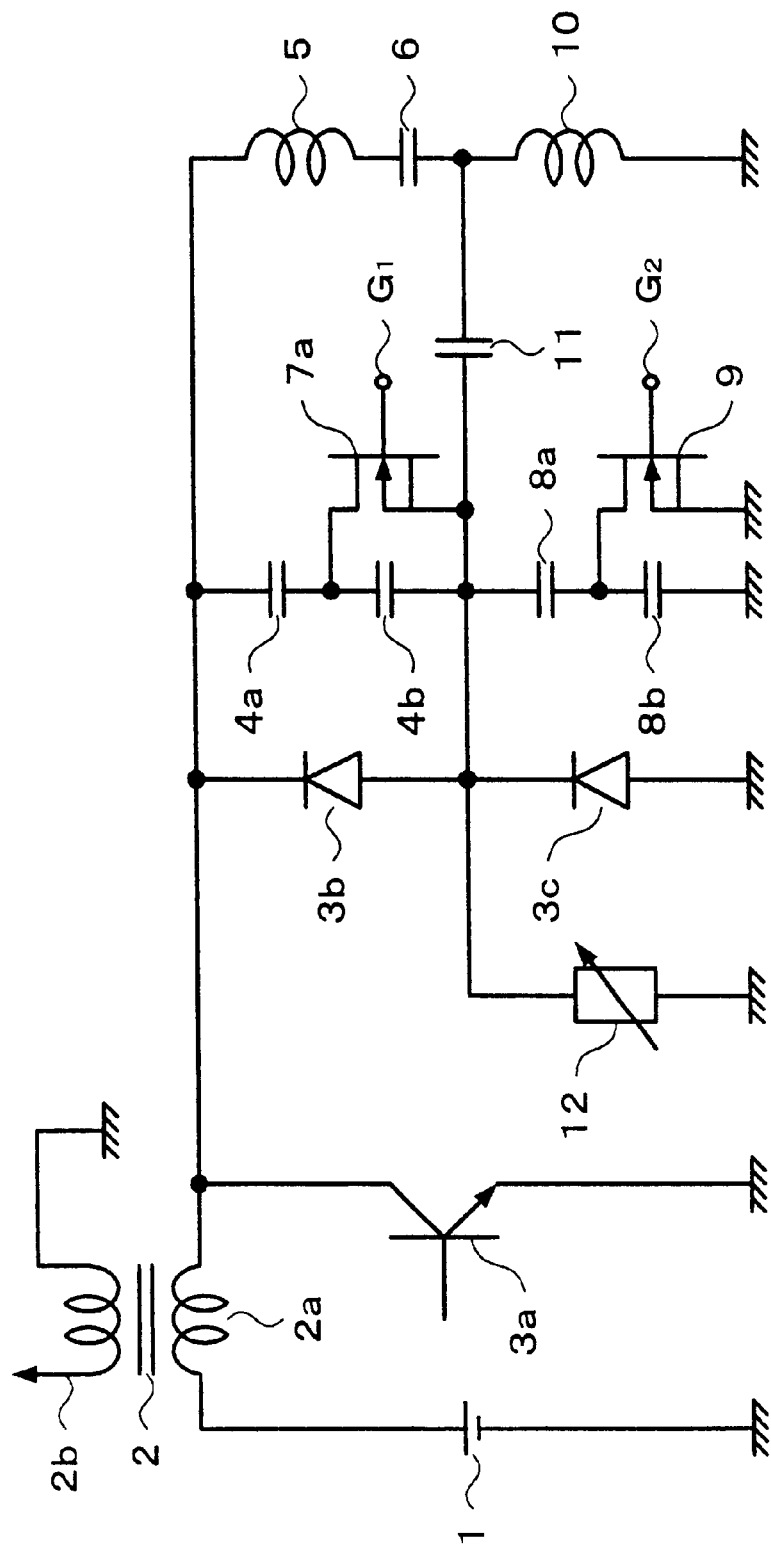
FIG. 4 is a connection diagram of a modification of another embodiment of the invention.

FIG. 4 shows a modification of the other embodiment. As shown in FIG. 4, the other end of the modulating coil 10 is connected to the ground and the second S-shaped correcting capacitor 11 provided between the modulating coil 10 and the ground is inserted between the node of the first auxiliary resonance capacitor 4b and second resonance capacitor 8a and the node of the first S-shaped correcting capacitor 6 and modulating coil 10. Further, one end of the variable load 12 is connected to the node of the capacitors 4b and 8a and the other end of the variable load 12 is connected to the ground. In the construction shown in FIG. 4 as well, an effect similar to that of the embodiment shown in FIG. 3 can be obtained.

Figure 5:
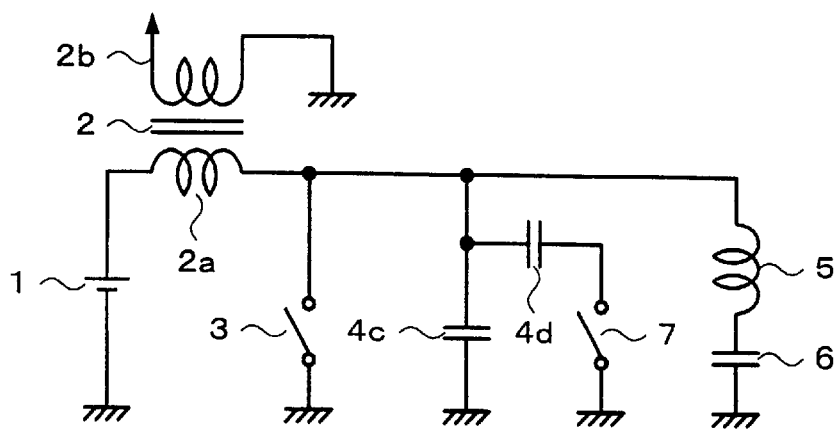
FIG. 5 shows yet another embodiment of the invention.
Figure 6:
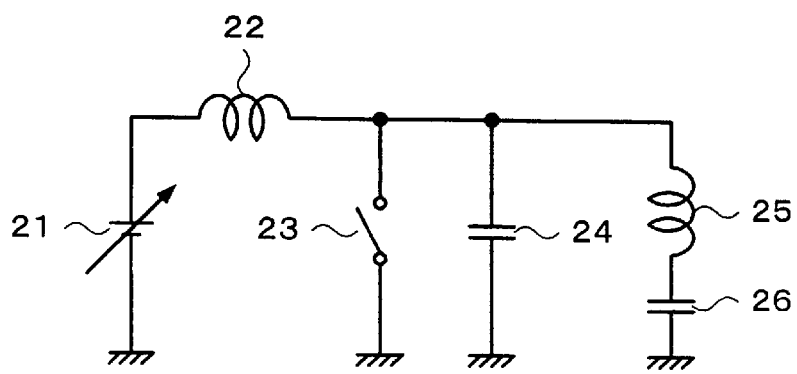
FIG. 6 is a connection diagram of a conventional horizontal deflecting circuit.
Figure 7:
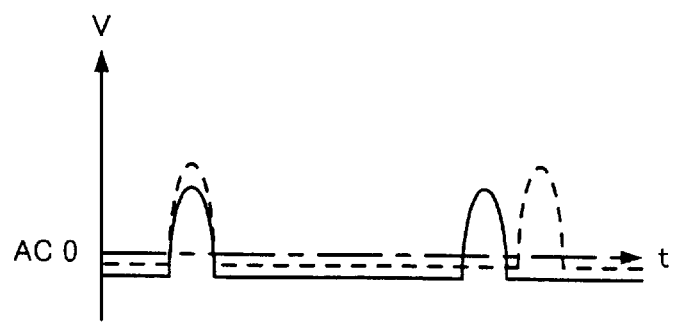
FIG. 7 is a waveform diagram for use in explaining of the conventional horizontal deflecting circuit.

FIG. 5 shows still another embodiment. As shown in the diagram, the node of the primary coil 2a and horizontal deflecting coil 5 is connected to the ground via a resonance capacitor 4c. A serial circuit of a capacitor 4d and the variable capacitive switching element 7 is connected between such a node and the ground. When the variable capacitive switching element 7 is turned on, the capacitors 4c and 4d are connected in parallel and a synthetic capacitance increases.

In the embodiment shown in FIG. 5, a capacitance of the sole capacitor 4c is set to be equal to the serial synthetic capacitance of the capacitors 4a and 4b of the embodiment shown in FIG. 1, and a parallel synthetic capacitance of the capacitors 4c and 4d when the variable capacitive switching element 7 is turned on is set to be equal to the capacitance of the sole capacitor 4a of the embodiment shown in FIG. 1.

Although the other embodiments have been described with respect to the construction using the FET as switching means, it is sufficient to use any means which functions as a switch. For example, another switching element can be also used.

Although the above embodiments have been described with respect to the cases where the invention copes with the two different horizontal frequencies as examples, the invention can also cope with three or more different horizontal frequencies. In this case, it is sufficient to increase the number of auxiliary resonance capacitors and the number of switches which are connected in parallel or serially with them in correspondence to the number of different horizontal frequencies.

According to the invention, the power voltage to supply an operating voltage to the horizontal deflecting circuit is fixed and it is possible to cope with two or more different horizontal frequencies. According to the invention, since there is no need to use the variable power source, the whole circuit can be simplified. The circuit can be used in common with a horizontal deflecting circuit of a television receiver corresponding to the single horizontal frequency. According to the invention, since a peak voltage of the retrace pulse is held constant, a fluctuation of another voltage such as an anode voltage or the like of the CRT can be prevented.

The present invention is not limited to the foregoing embodiments but many modifications and variations are possible within the spirit and scope of the appended claims of the invention.

What is claimed is:

1. A horizontal deflecting circuit for
   a CRT for displaying a first image based on a first input video signal of a first horizontal frequency and a second image based on a second input video signal of a second horizontal frequency different than said first horizontal frequency, comprising:

a serial connecting circuit of a horizontal deflecting coil and a correcting capacitor;

switching means connected in parallel across said serial connecting circuit;

a variable capacitive resonance capacitor connected in parallel across said serial connecting circuit;

a fixed power source;

a primary coil having one end connected to said serial connecting circuit and another end connected to said fixed power source; and a secondary coil coupled to said primary coil for forming another voltage from a retrace pulse that is generated in said primary coil, wherein a value of said variable capacitive resonance capacitor is varied so that a voltage of said retrace pulse in a case where said circuit is driven at said first horizontal frequency and the voltage of said retrace pulse in a case where said circuit is driven at said second horizontal frequency are set to substantially a same value.

2. The circuit according to claim 1, wherein said variable capacitive resonance capacitor comprises a plurality of capacitors serially connected and a variable capacitive switching element connected in parallel with a predetermined one of said plurality of capacitors.

3. The circuit according to claim 1, wherein said variable capacitive resonance capacitor comprises a plurality of capacitors arranged to be connected in parallel and a variable capacitive switching element arranged to connect a predetermined one of said plurality of capacitors in parallel.

* * * * *